C. BERST.
RAZOR BLADE HOLDER.
APPLICATION FILED FEB. 17, 1917.
1,257,179.
Patented Feb. 19, 1918.
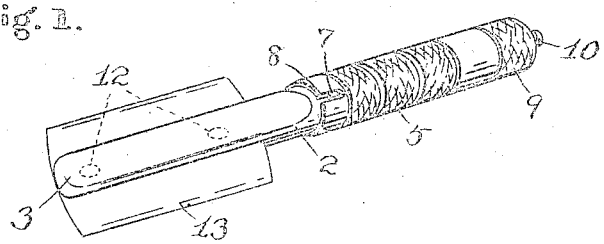
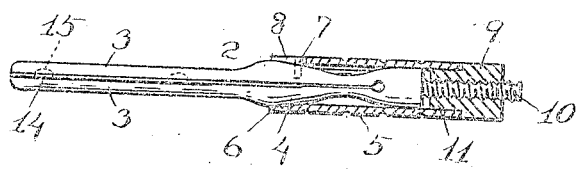
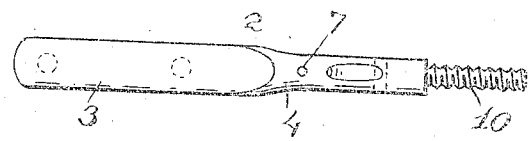
Witness
Stuart Felder
Inventor
Charles Berst.
By E.W. Anderson
Attorneys

UNITED STATES PATENT OFFICE.

CHARLES BERST, OF CHICAGO, ILLINOIS.

RAZOR-BLADE HOLDER.

1,257,179.　　　Specification of Letters Patent.　　Patented Feb. 19, 1918.

Application filed February 17, 1917. Serial No. 149,280.

*To all whom it may concern:*

Be it known that I, CHARLES BERST, a citizen of the United States, resident of Chicago, in the county of Cook and State of Illinois, have made a certain new and useful Invention in Razor-Blade Holders; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention.

Fig. 2 is a central longitudinal section of the same.

Fig. 3 is a detail plan view of the body member.

The invention has relation to razor blade holders, particularly designed for use in the sharpening or stropping of the blades of safety razors of the Gillette and Durham type, and it consists in the novel construction and combinations of parts, as hereinafter set forth.

In the accompanying drawings illustrating the invention, the numeral 2 designates the body member of the holder formed preferably of a single piece of metal having a central longitudinal slot extending the major part of its length, whereby the holder is provided with two clamping jaws 3, 3.

These jaws are normally separated or divergent through inherent spring of the metal, said member having a tapered portion 4 located intermediately of the length of the slotted portion thereof, a sliding cylindrical sleeve 5 having an aperture provided with a forward enlarged flaring portion 6 engaging said tapered portion of the body and acting to force said jaws together to clamp the razor blade located therebetween. The external diameter of the sleeve is about equal to the width of the jaws, and the longitudinal axes of sleeve and jaws are in alinement.

Means are provided to prevent rotation of the sleeve with relation to the body member, consisting usually of a pin 7 projecting outwardly from the tapered part of said member and engaging an open-end slot 8 of the sleeve.

Means are provided to force the sleeve home to clamping position and to secure the sleeve in such position consisting preferably of a threaded nut 9 engaging the threaded end 10 of said body member, said threaded end being of a diameter less than that of the internal diameter of the sleeve, and said nut having a reduced extension 11 of about the same external diameter as the internal diameter of the sleeve. Owing to this construction, the sleeve may slide freely upon the body member 2 and the extension 11, when the nut 9 is at the outer end of the threaded portion 10.

In releasing the blade, the device is held by the sleeve 5, and the nut unscrewed until a sufficient interval is obtained between the head of the nut and the normally abutting end of the sleeve, the blade remaining clamped by the frictional engagement of the spring jaws 3 and said sleeve. The nut 9 being held, the sleeve 5 is slid rearwardly until it contacts with the nut head, releasing the blade instantly.

The same independent sliding movement of the sleeve is very useful in clamping a blade, the nut being afterward screwed home to secure the parts in position. In this case the blade will be inserted between the jaws and immediately clamped in place, without the necessity of holding the jaws clamped until the nut is screwed home.

The clamping jaws are provided with means for engaging the central holes 12 of the razor blade 13, to hold the blade securely in straight position and consisting usually of knobs or protuberances 14 of one of the clamping jaws engaging opposite recesses 15 of the other of said jaws.

I claim:

In a razor blade holder, a body member having a reduced screw-threaded stem and integral normally divergent spring jaws provided with tapered portions and securing means for the blade comprising projections and opposite recesses, a nut upon said stem having a head and an inner reduced cylindrical extension, a cylindrical sleeve slidable upon said body member and cylindrical extension and engaging at one end the tapered portions of said jaws and engaged at the other end by the head of said nut, said body member having a pin and said sleeve having an open-ended slot engaging said pin.

In testimony whereof I affix my signature in presence of two witnesses.

CHARLES BERST.

Witnesses:
W. B. CODY,
G. B. CARLTON.